United States Patent
Ekchian et al.

(10) Patent No.: US 8,044,790 B2
(45) Date of Patent: Oct. 25, 2011

(54) RETROFIT CIRCUITRY FOR ENHANCED VEHICLE HAZARD WARNING LIGHTS

(75) Inventors: Jack A. Ekchian, Belmont, MA (US); Berj A. Terzian, Newbury, MA (US)

(73) Assignee: Trixcel, LLP, Newbury, MA (US)

(*) Notice: Subject to any disclaimer, the term of this patent is extended or adjusted under 35 U.S.C. 154(b) by 350 days.

(21) Appl. No.: 12/397,038

(22) Filed: Mar. 3, 2009

(65) Prior Publication Data
US 2010/0225465 A1 Sep. 9, 2010

(51) Int. Cl.
*B60Q 1/52* (2006.01)
(52) U.S. Cl. ........ 340/471; 340/463; 340/464; 340/468; 340/475; 340/479
(58) Field of Classification Search ........... 340/471, 340/463, 464, 468, 475, 479
See application file for complete search history.

(56) References Cited

U.S. PATENT DOCUMENTS

| | | | | |
|---|---|---|---|---|
| 5,119,067 A * | 6/1992 | Adell | ............ | 340/468 |
| 5,311,412 A * | 5/1994 | Yang | ............ | 362/541 |
| 6,243,008 B1 * | 6/2001 | Korabiak | ............ | 340/463 |
| 2009/0303029 A1 * | 12/2009 | Terzian | ............ | 340/471 |
| 2010/0026478 A1 * | 2/2010 | Ekchian et al. | ............ | 340/471 |

* cited by examiner

*Primary Examiner* — Hung T. Nguyen
(74) *Attorney, Agent, or Firm* — Lucas & Mercanti, LLP

(57) ABSTRACT

A third light is added above the lower two rear turn signal lights of an automotive vehicle Detection hardware is included which senses when both lower lights begin flashing simultaneously due to activation of the vehicle's 4-way hazard warning system. Such detection also introduces current pulses to the third light which flashes simultaneously with the lower two lights to generate a triangular configuration of the three flashing lights. Retrofit circuitry is described to enable installing the modified triangular signal into existing vehicles.

27 Claims, 2 Drawing Sheets

RETROFIT CIRCUITRY FOR ENHANCED VEHICLE HAZARD WARNING LIGHTS

FIELD OF THE INVENTION

This invention relates to electronic circuits which facilitate retrofitting enhanced vehicle hazard warning lights into existing passenger cars, light trucks and similar automotive vehicles.

PRIOR TECHNOLOGY AND PROBLEMS

U.S. Pat. No. 7,352,278 teaches an enhanced vehicle hazard warning lights system which establishes a flashing triangle in the rear window of a vehicle by transmitting current pulses from a 4-way hazard pulse generator to the vehicle's rear turn signal lamps, as well as its center high mounted rear stop light ("CHMSL").

An improvement of the '278 patented system is described in co-pending application Ser. No. 12/136,370, entitled "Continuous Enhanced Vehicle Hazard Warning Lights." Basically, the cited application prevents intermittent interruptions of the flashing triangle of the '278 patent system whenever the vehicle brakes are applied while the 4-way flasher is operating.

The disclosures of the above cited '278 patent and the co-pending application are incorporated by reference herein. These innovations are designed to reduce the number of rear end collisions and losses which occur annually on the roads and highways of the United States. According to year 2000 updated statistics published by the National Highway Traffic Safety Administration ("NHTSA"), such numbers on average are numbing, viz. 1.5 million crashes that result in 2,000 deaths, 950,000 injuries and $18.3 billion of economic losses.

In 2006, there were nearly 251 million registered vehicles in the United States. As time goes on, this number will likely increase, thus creating potential for even more rear end crashes and losses of life, health and economic values.

Accordingly, there is a critical need for an inexpensive means and method for retrofitting the enhanced hazard warning lights described above into the vast number of existing vehicles, in the United States and elsewhere in the world, in order to significantly reduce rear end collisions and the damage and losses thereby caused.

SUMMARY OF THE INVENTION

The present invention provides a simple, inexpensive and effective means for retrofitting the enhanced triangular vehicle hazard warning lights, taught in the cited '278 Patent and co-pending application Ser. No. 12/136,370, into existing automotive vehicles. The cost of parts, labor and time for such retrofitting is modest and well within the purchasing ability of vehicle drivers and owners in the interest of achieving greater protection against rear end collisions among the millions of automotive vehicles driven every day throughout the world.

BRIEF DESCRIPTION OF THE DRAWINGS

Further details of the invention will be readily understood by reference to the following drawings.

DETAILED DESCRIPTION OF THE DRAWINGS

Figure 1:
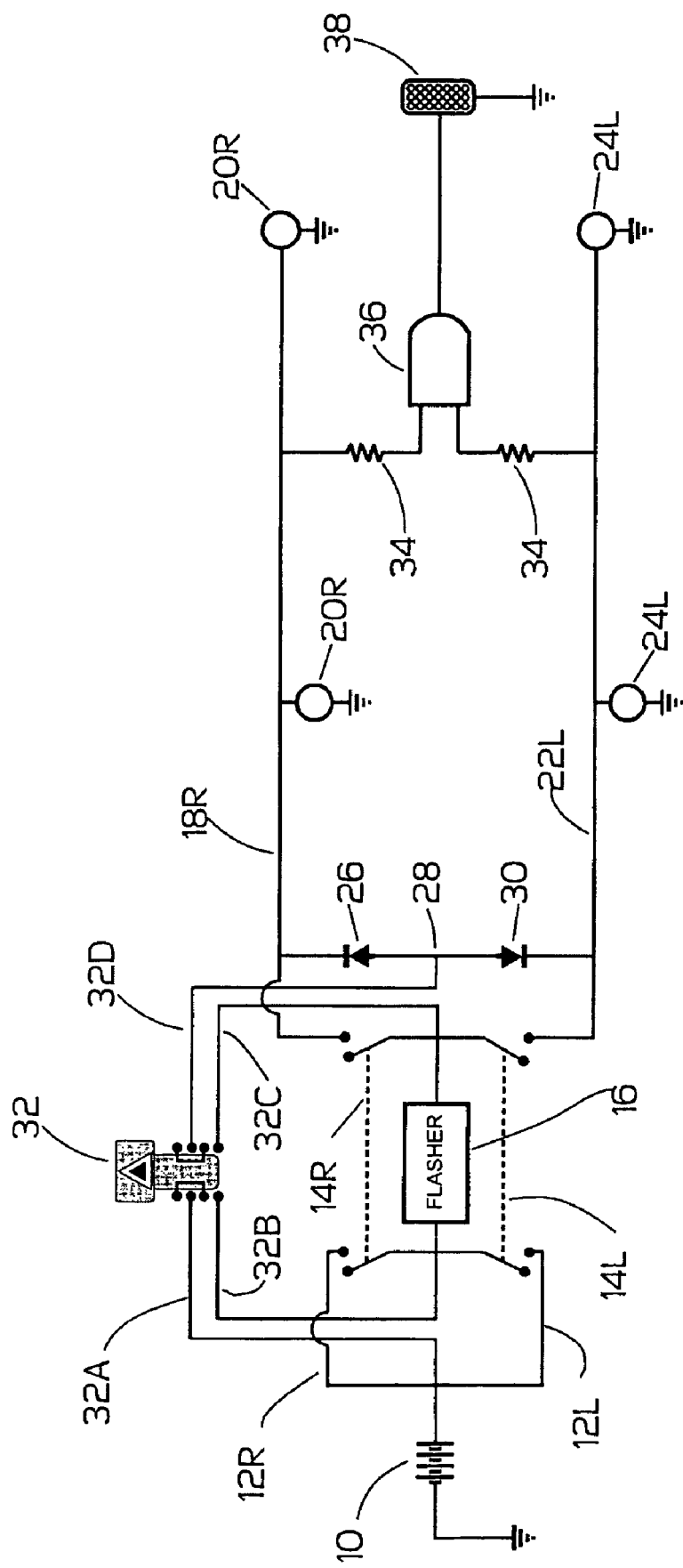
FIG. 1 depicts an electronic circuit that comprises an embodiment of the invention.

Referring to FIG. 1, numeral 10 designates a vehicle power source, either a battery or rectified alternator output. Leads 12R and 12L connect the power source 10 to ganged switches 14R and 14L which are depicted in open condition.

On the left and right sides of flasher 16, the two pairs of open contacts represent, on the left, a vehicle turn signal switch which is manually closed by pushing the control stalk up to initiate a right turn or down to initiate a left turn. Such manual actuation simultaneously closes one or the other of open switch contacts on the right side of the flasher, depending on whether a right or left turn is to be executed. The switches on the right and left sides of the flasher may be physically connected together or connected with a servo.

Thus, if a right turn is selected by the driver, electric current flows through the left closed contacts into flasher 16. Pulses emerge therefrom and flow through the right closed contacts of the ganged switches 14R into lead 18R. Lead 18R transmits the pulses to the right front and right rear turn signal lamps 20R which begin flashing. Upon completion of the right turn, the control signal stalk automatically returns to a neutral position, which opens both pairs of the ganged switch contacts 14R to terminate pulse generation and flashing of lamps 20R.

Similarly, when a left turn in to be made, the turn signal stalk is pushed to the opposite position which closes the contact pairs of ganged switches 14L to transmit electric current to flasher 16. Pulses emerge from flasher 16 into lead 22L which transmits the pulses to the left front and left rear turn signal lamps 24L to begin flashing such lamps. After completion of the left turn, automatic opening of the contacts: of ganged switches 14L terminates pulse generation and flashing.

During flashing of the right turn signal lamps 20R, silicon diode 26 blocks reverse flow of pulses into the left turn signal lamps 24L. Likewise, during flashing of the left turn signal lamps 24L, silicon diode 30 blocks reverse flow of pulses into the right turn signal lamps 20R.

Numeral 32 designates a 4-way hazard warning switch, normally configured as a double bordered triangle on a push button and located on a vehicle dashboard or the vehicle steering column. When button 32 is pushed down, its two pair of moving contacts abut the two pair of stationary contacts which creates a circuit from power source 10 through leads 32A, 32B, flasher 16, lead 32C and lead 32D.

Lead 32D transmits the pulses to a T intersection (arrow 28) through which the pulses flow into leads 18R and 22L. As a result, all four lamps 20R and 24L begin flashing a conventional 4-way hazard warning signal, in the front and rear of the vehicle.

Leads 18R and 22L are connected by a bridge circuit comprising resistors 34 which serve as inputs to AND gate 36. The output terminal of AND gate 36 is connected preferably to an array of LED diodes 38 which preferably emits a yellow color when energized.

AND gate 36 remains nonconductive if only one of resistors 34 is electrified. Therefore, when right or left turn signals are made, only the lamp pairs 20R or 24L undergo flashing and, therefore, current cannot flow through the gate 36. If, however, a 4-way hazard warning signal is generated by button 32, all four lamps 20R and 24L begin simultaneously flashing. As a result, both resistors 34 become electrified by the pulses emitted from flasher 16, AND gate 36 becomes conductive and the pulses flow through it to energize LED array 38. Thus, a more effective and attention-getting triangular flashing hazard warning signal is automatically generated in the vehicle's rear. This flashing triangle may be uniformly colored yellow in vehicles which have yellow colored turn signal lamps, or multicolored if the turn signal lamps emit amber or red flashing lights.

The circuit comprising resistors 34, AND gate 36 and associated leads functions as a monitor which detects whether or not the turn signal lamps 20R and 24L are or are not simultaneously flashing. If not, no flashing of the LED array 38 can begin. If simultaneous flashing of all four lamps turn signal lamps begins, due to initiation of a 4-way hazard signal, LED array is activated to also flash simultaneously and synchronously with turn signal lamps 20R and 24L. Resistors 34 are included to reduce the voltage from flasher 14 to a voltage that is within the specifications of the AND gate 36.

The illustrative embodiment greatly facilitates retrofitting this improved hazard warning signal into existing vehicles. All of the components are quite inexpensive, in the range of cents to a modest number of dollars in unit costs. The required parts, two resistors, AND gate, LED array and their associated leads can be assembled in a common housing from which two leads can extend in sufficient length for electrical attachment to the vehicle. In particular, the outboard resistor leads can be connected to the sockets that transmit pulses to the turn signal lamps or spliced to the hot leads that transmit the pulses to the lamps. The LED array ground lead can be fixed into contact with any electrically conductive surface or component of the vehicle.

Figure 2:
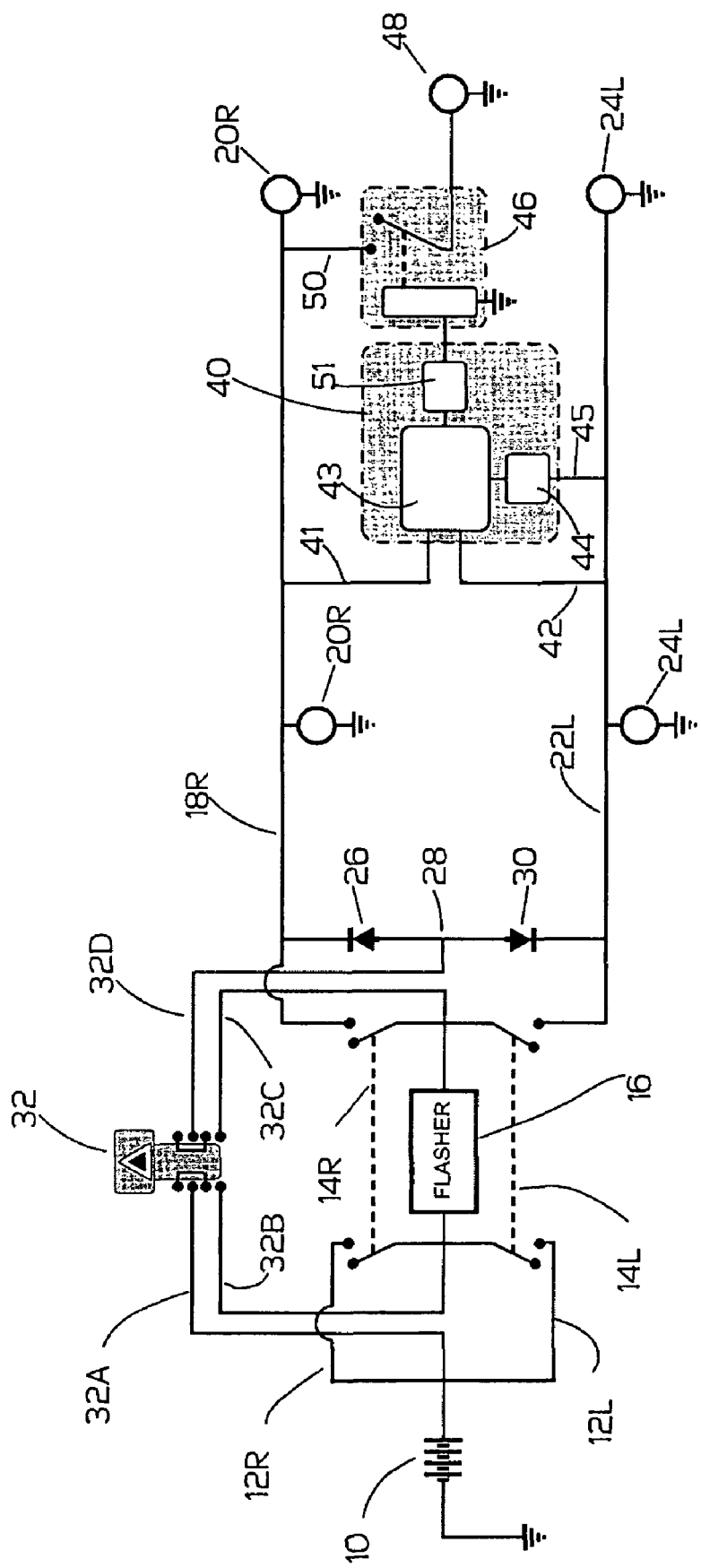
FIG. 2 depicts another embodiment of the present invention.

FIG. 2 shows a second embodiment of the invention where the voltages on leads 18R and 22L are compared by comparator circuit 40. The comparator circuit 40 is connected to lead 18R by means of lead 41 and to lead 22L by means of lead 42. The comparator circuit 40 comprises a high voltage AND gate suitable for use with the voltages emanating from the flasher and rectifier circuit 44. It is also connected to lead 22L by means of rectifier circuit 44 and lead 45 that deliver a rectified supply voltage to the AND gate. The AND gate supplies relay 46 with necessary power to close the relay and connect apex light 48 to lead 18R by means of lead 50. When the 4-way hazard switch 32 is depressed, the flasher causes the same fluctuating voltage to be present on leads 18R and 24L. As a result fluctuating output voltage from the AND gate is supplied to relay 46 by means of rectifier circuit 51. The power supplied to the relay 46 closes it and allows the pulses from lead 50 that are supplied to lamps 20R and 24.L to also reach lamp 48. As a result when lamps 20R and lamps 24L are flashing simultaneously, then lamp 48 flashes synchronously with them. Otherwise lamp 48 remains dark.

The embodiment in FIG. 2 can be retrofitted in a vehicle by placing apex light 48 an the comparator 40, and relay 46 in a housing, positioning it at the rear of the vehicle, and connecting it to the leads supplying the rear turn signal lights. The housing does not require direct connection to the power source 10.

The invention has been described in terms of its functionality and illustrative embodiments. Many variants of the illustrative embodiments will be evident to those skilled in the art. Accordingly, it should be understood that it is intended to cover all variations or modifications of the illustrative embodiments of the present invention that fall within the scope of the appended claims and all equivalents thereof.

What we claim is:

1. In an automotive vehicle having 4-way hazard warning lights, at least two of which are located on the left and right sides of the vehicle's rear, a system for exhibiting a triangular rear hazard warning signal which comprises:
    (a) a third light located above the lower two lights to enable generating a triangular pattern of lights when all three are activated;
    (b) means for detecting current pulses transmitted simultaneously to the two lower rear lights to flash said lights; and
    (c) means responsive to such detection for simultaneously transmitting current pulses to the third light to generate a flashing triangular hazard signal formed by the three lights.

2. The system according to claim 1 wherein, the responsive means remains inactive when current pulses are transmitted to only one or the other of the lower two lights to generate left or right turn signals with said lights.

3. The system according to claim 1 wherein, the detecting means includes an AND gate having input leads that are connected to the leads that transmit current pulses to the two the rear lower lights.

4. The system according to claim 3 where resistors are connected in series into the input leads to the AND gate to control the voltage and current through the AND gate at desired levels.

5. The system according to claim 1 wherein, the detecting means contains a circuit that draws power from the pulses being supplied to one of said lower lights.

6. The system according to claim 1 wherein, the detecting means contains an AND gate that is connected to a relay such that the relay is closed if the same power is supplied to the lower rear lights.

7. The system according to claim 6 wherein, the relay, when it is closed, supplies the same voltage to said third light that is supplied to one of the lower lights.

8. The system according to claim 3 where resistors are connected in series into the input leads to the AND gate to control the voltage and current through the AND gate at desired levels.

9. The system according to claim 8 wherein, the desired levels are 3.5 volts at 20 milliamps.

10. A system according to claim 1 wherein, the third light comprises an array of LED diodes.

11. A system according to claim 1 wherein, the recited means and the third light are assembled in a common housing with leads projecting out of the housing for connection of the detecting means to the leads or sockets which transmit current pulses to the two lower lights, and for connection of the third light to ground on the vehicle, thereby facilitating retrofitting of the system to existing vehicles.

12. In a motor vehicle having 4-way hazard warning lights, two of which are located on the right and left sides of the vehicle's rear, a method of retrofitting the vehicle with an enhanced hazard signal which comprises:
    (a) including at least an additional light above the two lights in the vehicle's rear to enable flashing all three lights in a triangular configuration,
    (b) providing a detector having at least dual inputs and at least one output, said detector becoming electrically conductive when it detects simultaneous electrical pulses being transmitted to the two lower lamps from the vehicle's flasher,
    (c) connecting the dual inputs to leads that generate flashing respective right or left turn signals with the two lower lamps, said connections bridging across the turn signal leads to transmit the simultaneous electrical pulses thereof to the dual inputs of the detector,
    (d) connecting said output to said additional light, thus retrofitting the modified system to an existing vehicle whereby upon activation of the vehicle's 4-way hazard warning lights the detector senses the simultaneous pulses in the turn signal leads and transmits such pulses through its input leads and output lead also to the additional light to generate a flashing triangular hazard warning signal.

13. A method according to claim 12 wherein the additional light, the detector and the dual input and output leads are assembled in a common housing.

14. A method according to claim 13 wherein the dual input leads and the additional light's ground lead are extended out of the housing to enable connecting the dual input leads to the turn signal leads and the additional light's ground lead to an electrical ground of the vehicle.

15. A method according to claim 12 wherein the detector comprises an AND gate having two input leads and an output lead.

16. A method according to claim 15 which includes providing resistors connected to the input leads to control voltage and current through the AND gates at desired levels.

17. A method according to claim 16 wherein the resistors maintain the voltage and current levels applied to the AND gate at 3.5 volts and 30 milliamps.

18. A method according to claim 12 which includes providing a circuit which draws power from the pulses being supplied to at least one of the two lower lights for use to power the detector.

19. In a vehicle having 4-way hazard warning lights, two of which are located on the right and left sides of the vehicle's rear, a method of retrofitting the vehicle with an enhanced hazard signal which comprises:
(a) including at least an additional light above the two lights in the vehicle's rear to enable flashing all three lights in a triangular configuration,
(b) providing a detector having at least dual inputs and at least one output, said detector becoming electrically conductive when it detects simultaneous electrical pulses being transmitted to the two lower lamps from the vehicle's flasher,
(c) connecting the dual inputs to leads that generate flashing respective right or left turn signals with the two lower lamps, said connections bridging across the turn signal leads to transmit the simultaneous electrical pulses thereof to the dual inputs of the detector,
(d) providing a relay that is connected to the output of said detector and to at least one of the leads that generate flashing respective right or left turn signals so that when the detector is conductive the relay is closed and the electricity from at least one of the rear lights reaches the third light, thus retrofitting the modified system to an existing vehicle, whereby upon activation of the vehicle's 4-way hazard warning lights the detector senses the simultaneous pulses in the turn signal leads and closes a relay which transmits such pulses through the relay to the additional light to generate a flashing triangular hazard warning signal.

20. A method according to claim 19 wherein the additional light, the detector and the relay are assembled in a common housing.

21. A method according to claim 20 wherein the turn signal leads and the additional light's ground lead out of the housing are extended to enable connecting the dual input leads of the detector to the turn signal leads and the additional light's ground lead to a vehicle ground.

22. A method according to claim 19 wherein the detected pulses are equivalent.

23. In a motor vehicle having a 4-way hazard warning system, the system comprising at least one lamp located on the left side and at least one lamp on the right side of the vehicle's rear which are in substantial horizontal alignment and operable as either flashing left or right turn signals, the improvement comprising:
(a) at least a third lamp located substantially equidistant from said at least two lamps which are operable as left or right turn signals,
(b) a switch which is operable to initiate synchronous flashing of said at least one lamp on the left side, at least one lamp on the right side and third lamp, on and off, in a predetermined frequency, no white light being exhibited during each off phase of each flashing cycle, whereby the three flashing lamps provide improved visibility and efficacy of the resulting hazard warning signal.

24. The improvement according to claim 23 wherein said third lamp is located at a vertical position above said at least two lamps which are operable as left or right turn signals.

25. The improvement according to claim 24 wherein said at least two lamps are proximate to the vehicle's service brake lamps.

26. The improvement according to claim 24 wherein said three flashing lamps exhibit red, amber or yellow colors, or mixtures thereof.

27. The improvement according to claim 25 wherein said three flashing lamps exhibit red, amber or yellow colors, or mixtures thereof.

* * * * *